United States Patent
Van Den Broeck et al.

(10) Patent No.: US 9,961,078 B2
(45) Date of Patent: May 1, 2018

(54) NETWORK SYSTEM COMPRISING A SECURITY MANAGEMENT SERVER AND A HOME NETWORK, AND METHOD FOR INCLUDING A DEVICE IN THE NETWORK SYSTEM

(71) Applicant: THOMSON LICENSING, Issy de Moulineaux (FR)

(72) Inventors: Roeland Van Den Broeck, Schilde (BE); Joris Bleys, Berchem (BE); Bruno De Bus, Hamme (BE)

(73) Assignee: Thomson Licensing (FR)

( * ) Notice: Subject to any disclaimer, the term of this patent is extended or adjusted under 35 U.S.C. 154(b) by 62 days.

(21) Appl. No.: 14/780,647

(22) PCT Filed: Mar. 25, 2014

(86) PCT No.: PCT/EP2014/055911
§ 371 (c)(1),
(2) Date: Sep. 28, 2015

(87) PCT Pub. No.: WO2014/154660
PCT Pub. Date: Oct. 2, 2014

(65) Prior Publication Data
US 2016/0057141 A1      Feb. 25, 2016

(30) Foreign Application Priority Data

Mar. 28, 2013  (EP) ..................................... 13305393
Mar. 7, 2014  (EP) ..................................... 14305329

(51) Int. Cl.
*H04L 29/06* (2006.01)
*H04L 9/32* (2006.01)
(Continued)

(52) U.S. Cl.
CPC ........ *H04L 63/0869* (2013.01); *H04L 9/3268* (2013.01); *H04L 12/2834* (2013.01);
(Continued)

(58) Field of Classification Search
None
See application file for complete search history.

(56) References Cited

U.S. PATENT DOCUMENTS 7,415,110 B1    8/2008  Lee
8,228,861 B1 *  7/2012  Nix ...................... H04W 36/00
                                                      370/329
(Continued)

FOREIGN PATENT DOCUMENTS

CN    102244868    11/2011
JP    2006258618   10/2006

OTHER PUBLICATIONS

Hjorth Etal: "Trusted Domain—A Security Platform for Home Automation"; Department of Electronic Systems Aalborg University: Jul. 10, 2012; pp. 940-955.

(Continued)

*Primary Examiner* — Jason K Gee
*Assistant Examiner* — Olanrewaju J. Bucknor
(74) *Attorney, Agent, or Firm* — Jack Schwartz & Associates, PLLC

(57) ABSTRACT

The network system comprises a security management server and a first device is added to the network system by creating a one-time code on the security management server, which is used for connecting the device to the security management server. A server certificate is sent to the device, and a user device certificate generated in the device is sent to the security management server. The user device certificate is signed with an administrator key on the security management server, which signed user device certificate is
(Continued)

sent from the security management server to the device and which is used by the device for communication with a further device of the network system. The network system is in particular a secured home network.

10 Claims, 3 Drawing Sheets

(51) Int. Cl.
    *H04W 12/06*     (2009.01)
    *H04L 12/28*     (2006.01)
    *H04N 21/436*     (2011.01)

(52) U.S. Cl.
    CPC .......... *H04L 63/0823* (2013.01); *H04L 63/12* (2013.01); *H04W 12/06* (2013.01); *H04L 63/0838* (2013.01); *H04N 21/43615* (2013.01)

(56) References Cited

U.S. PATENT DOCUMENTS

| | | | |
|---|---|---|---|
| 8,375,207 B2 | 2/2013 | Dangoor et al. | |
| 2005/0210252 A1* | 9/2005 | Freeman | G06F 21/31 713/171 |
| 2006/0218622 A1 | 9/2006 | Kimura | |
| 2007/0033642 A1* | 2/2007 | Ganesan | H04L 63/0428 726/10 |
| 2008/0016336 A1* | 1/2008 | Stirbu | H04L 63/0823 713/156 |
| 2008/0184030 A1 | 7/2008 | Kelly et al. | |
| 2009/0165099 A1 | 6/2009 | Eldar et al. | |
| 2009/0253409 A1 | 10/2009 | Slavov et al. | |
| 2009/0313680 A1 | 12/2009 | Hirano et al. | |
| 2012/0002594 A1* | 1/2012 | Racz | H04B 7/15557 370/315 |
| 2013/0031360 A1 | 1/2013 | Dewitz et al. | |
| 2013/0091353 A1* | 4/2013 | Zhang | H04L 9/3268 713/156 |
| 2013/0132854 A1* | 5/2013 | Raleigh | G06F 3/0482 715/738 |
| 2013/0179692 A1* | 7/2013 | Tolba | H04L 63/08 713/179 |
| 2013/0268620 A1* | 10/2013 | Osminer | H04N 21/251 709/217 |
| 2014/0164781 A1* | 6/2014 | Joshi | G06F 21/31 713/184 |
| 2014/0282869 A1* | 9/2014 | Dabbiere | H04L 63/10 726/3 |
| 2014/0359741 A1* | 12/2014 | Kistner | H04L 63/0823 726/7 |

OTHER PUBLICATIONS

Search Report dated Jun. 30, 2014.

\* cited by examiner

NETWORK SYSTEM COMPRISING A SECURITY MANAGEMENT SERVER AND A HOME NETWORK, AND METHOD FOR INCLUDING A DEVICE IN THE NETWORK SYSTEM

This application claims the benefit, under 35 U.S.C. § 365 of International Application PCT/EP2014/055911, filed Mar. 25, 2014, which was published in accordance with PCT Article 21(2) on Oct. 2, 2014 in English and which claims the benefit of European patent application No. 13305393.4, filed Mar. 28, 2013 and European patent application No. 14305329.6, filed Mar. 7, 2014.

TECHNICAL FIELD

The invention relates to the field of telecommunications systems and devices, in particular to network systems and devices operating via a broadband connection with a service provider network.

BACKGROUND OF THE INVENTION

Residential gateways are widely used to connect devices in a home of a customer to the Internet or to any other wide area network (WAN). Residential gateways use for example digital subscriber line (DSL) technology that enables a high data rate transmission over copper lines or over optical fiber broadband transmission systems.

Home networks have become part of everyday life for many end users. A home network consists of a range of heterogeneous components which means that the home network is made up of different kinds of devices. Examples are smart phones, tablets, PCs, smart TVs, set-top boxes (STB), Gateways and network attached storage devices (NAS). These devices often communicate between each other by using existing protocols like Apple's Bonjour, Universal Plug and Play (UPnP), Server Message Block (SMB), Hypertext Transfer Protocol (HTTP) or IP based proprietary protocols.

The communication between user devices often happens without or with weak authentication mechanisms where only the user that logs in to the device is verified. Users often use the same password on their devices to ease authentication but this weakens security a lot. Communication between devices within the home network often happens without any authentication.

Weak authentication can be attacked easily using brute force attacks. Device to device authentication can be sniffed and the data can be abused. A lot of solutions in the house needs stronger security, e.g. for home automation and home security. It is not acceptable that unauthorized users or guests with temporary access to the home network are able to communicate with the home infrastructure of a user in an unsecure way.

SUMMARY OF THE INVENTION

The network system according to the invention comprises a security management server, wherein a first device is added to the network system by creating a one-time code on the security management server, which is used for connecting the device to the security management server, and sending a server certificate to the device. Further, a user device certificate being generated in the device is sent to the security management server, and the user device certificate is signed with an administrator key on the security management server, which signed user device certificate is sent from the security management server to the device and which is used by the device for communication with any further device of the network system.

In a preferred embodiment, the administrator provides a fingerprint together with the one-time-code to the user, the message including the server certificate includes in addition the fingerprint, and the user has to verify the fingerprint on the device, before the device sends the user device certificate to the security management server.

The network system protects user's devices and applications communicating with each other within the network system. The network system includes a security infrastructure managed by an administrator, which is responsible for managing the network system. The administrator is responsible for adding users and user's devices. Only registered devices can be used within the network system and a device to device communication is provided only after mutual authentication between the devices, for which communication both devices need a certificate. The communication between the devices of the network system can be encrypted to protect valuable information against malicious use.

All of the devices of the network system need a certificate being signed by the security management server. Also guest users can be granted access to the network system by the administrator and later denied access. A user can be revoked by an administrator of the network system by revoking all his devices from the network system. Also a lost or stolen device can be revoked by the administrator.

In a further aspect of the invention, the network system is a secured home network comprising a residential gateway and a multitude of devices, wherein the secured home network is adapted for a connection with a service provider network via a broadband connection for providing Internet services. The home network may include also a home automation system including devices communicating with each other by using user device certificates signed by the administrator key.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, a network system comprising a security management server and a secured home network and a method for including a device in the network system are described. For purposes of explanation, numerous specific details are set forth in order to provide a thorough understanding of the embodiments. It will be evident, however, to one skilled in the art that the present invention may be practiced without these specific details.

Figure 1:
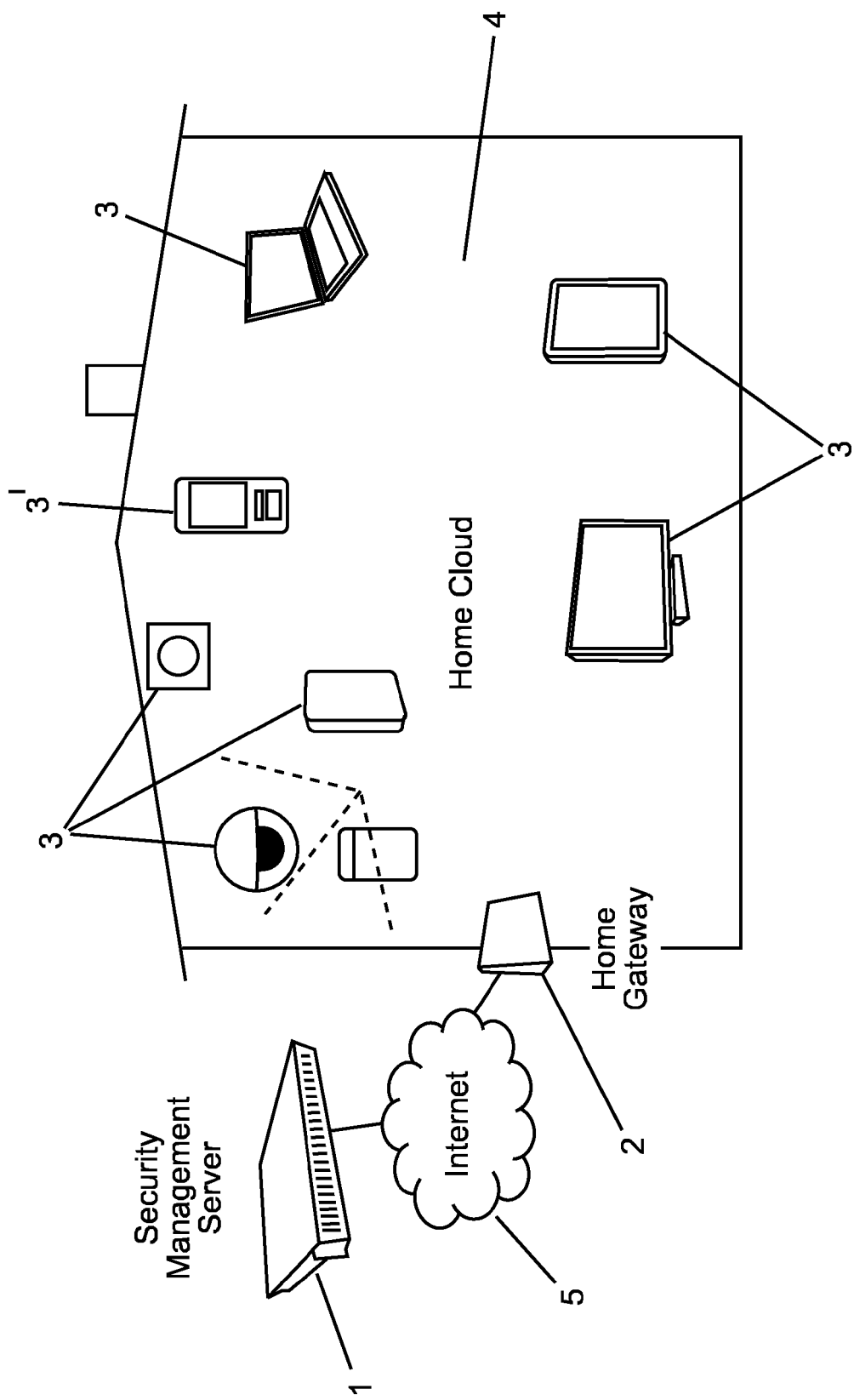
FIG. 1 a security management server and a secured home network including a residential gateway and a multitude of devices, FIG. 2 a sequence diagram illustrating a method for adding a new device to the home network of FIG. 1, and FIG. 3 a sequence diagram illustrating a secure communication between two devices of the home network of FIG. 1.

The network system comprises in a preferred embodiment a security management server 1 and a secured home network 4 including a residential gateway 2 and a multitude of devices 3, as illustrated schematically in FIG. 1. The devices 3 are Internet enabled devices, for example a PC, a laptop, a tablet PC, a smartphone, a television set and/or devices of a home automation system. The home automation system connects a multitude of sensors and cameras together. The residential gateway 2 connects the home network 4 for example via a DSL connection with a network service provider (NSP) network and the Internet 5.

The security management server 1 is provided for the security of the home network 4 and is in a preferred embodiment located in the Internet 5, outside of the secured home network 4. In this case, the security management server 1 is reachable from the secured home network 4 via the residential gateway 2. The security management server 1 is adapted to manage a multitude of secured home networks independently. Each secured home network is controlled by a respective administrator.

A user using a device 3' will be granted access to the secured home network 4 by the administrator of the secured home network 4 and to a well-defined functionality of applications on other devices 3 of the secured home network 4. All the devices 3 run further a security application being responsible for the security of each device 3 such that the users of the devices 3 can run applications on and between the devices 3 being protected against unwanted persons. The administrator can be a person having access to the security management server 1 via the Internet or can be a software function included e.g. in the security management server 1.

The following functionality is available on the security management server 1:

A new administrator account can be created on the security management server 1. By creating the new administrator account, a new secured home network is generated being controlled by a respective administrator.

Users can be added to the secured home network by the administrator of the secured home network.

The administrator can add user's devices to the secured home network, and

The administrator can grant access rights to the users of the secured home network 4.

For adding a new device 3' to the secured home network 4, the administrator requests a one-time code (OTC) from the security management server 1. The one-time code is entered on the new device 3' by the user and used to request a signed certificate for the device 3' from the security management server 1, the signed certificate providing an identity for the new device 3'. The security management server 1 verifies, if the one-time code is known. If known, a device and user based certificate is generated and signed by the security management server 1 for allowing access to the secured home network 4 and then sent to the new device 3'. To avoid a man in the middle attack, a fingerprint is displayed to the device owner on the new device 3'. In case the displayed finger print is the same fingerprint as displayed on the security management server 1 or as provided by the administrator, the user accepts the displayed fingerprint. If the displayed fingerprint is not the same, the user has to deny the signed certificate. When the user accepts the fingerprint, the new device 3' is associated in a further step to the secured home network 4 by the security management server 1.

A one-time code is understood in this context as a one-time password: a prearranged word, phrase or symbol that is intended to be used only once to convey a message. The one time code is valid for only one login session or transaction. A fingerprint in this context is understood as a public key fingerprint created for example by applying a cryptographic hash function to a public key. The fingerprint can be used in particular for authentication, e.g. of a signed certificate.

Once two devices 3 within the secured home network 4 have a known identity provided by a respective signed certificate, then the users can use to setup a mutual authenticated secure connection between the two devices 3, for example by using a transport layer security (TLS) protocol, a datagram transport layer security (DTLS) protocol or any other security protocol. At both ends of the secured connection, the user associated with the respective device 3 is known, so that the access to a specific functionality of a user can be allowed or restricted.

The method for generating a secured home network 4 comprises several of the following steps:

1. A new secured home network is generated by creating a new administrator account. The administrator of the new administrator account is responsible for adding users and user's devices.
2. A user starts an application on his device that is enabled for the secured home network.
3. The user is asked to type in a One Time Code (OTC).
4. The administrator adds the user to his secured home network if the user is new.
5. A new device is added for the user by the administrator.
6. On the security management server 1 a window is shown with the OTC and the security management server's fingerprint.
7. The administrator shows the OTC and the fingerprint to the user.
8. The user enters the OTC on his device.
9. The device connects to the security management server 1.
10. The security management server 1 uses the OTC to identify the device.
11. The security management server 1 verifies the OTC and generates a signed certificate as a device identity for the user's device for the secured home network.
12. The security management server 1 sends the device identity back to the device.
13. The device shows a fingerprint to the user.
14. If the fingerprint is correct, then the user accepts the fingerprint, if not he has to deny the identity.
15. The device is ready to communicate securely with other devices of the secured home network 4.

Figure 2:
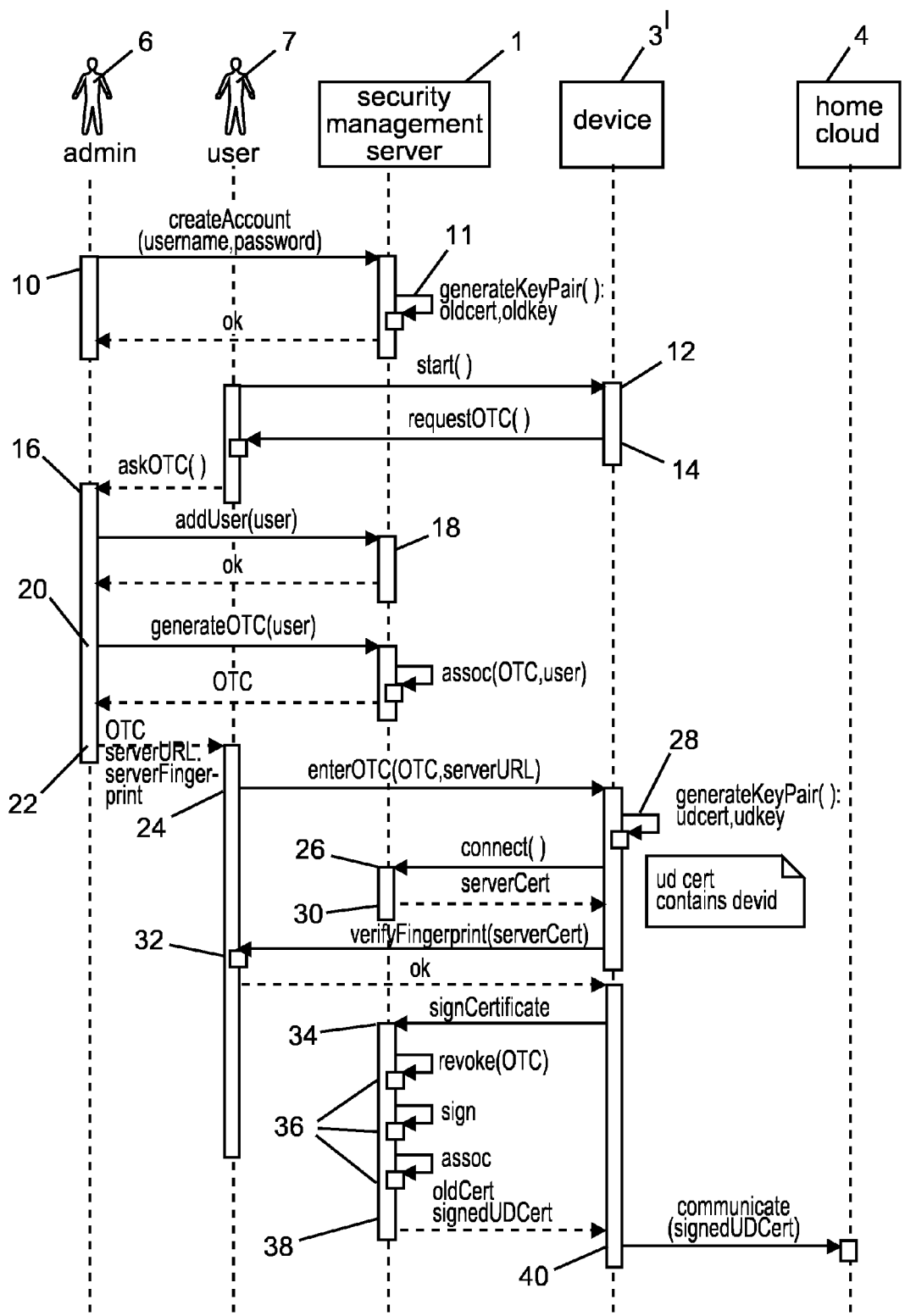

A preferred embodiment for a method for adding a new device to a secured home network is illustrated now in more detail with regard to FIG. 2. FIG. 2 is a sequence diagram showing interactions between the security management server 1 and a device 3' of a user 7, which has to be integrated by the administrator 6 into the secured home network 4.

The secured home network 4 is generated by the security management server 1 on request of any person, which acts later as the administrator 6 of the secured home network 4. When the security management server 1 creates the administrator account for the secured home network 4, a user name and a password for the administrator account is generated on the security management server 1 for the administrator 6, step 10. With the administrator account, also a key pair including a server certificate and a key for signing is generated on the security management server 1, step 11. The secured home network 4 is then established and users and user's devices can be added to the secured home network 4 by the administrator 6.

In step 12, a user 7 starts an application on the device 3' for adding the device 3' to the secured home network 4. For the operation of the device 3' within the secured home network 4, the device 3' requests a one-time-code from the user, step 14, which allows the user to log in to the security management server 1. The user then asks the administrator 6 to provide a one-time-code for his device 3', step 16. The administrator 6 then adds the user 7 to the secured home network 4 on the security management server 1, step 18, and requests from the security management server 1 a one-time-code being associated with the user 7, respectively the user's device 3', step 20. The administrator 6 logs in to the security management server 1 by using his user name and the password for his administrator account.

In step 22, the administrator forwards the one-time-code and also a Uniform Resource Locator (URL) of the security management server 1 and a fingerprint to the user 7. The user 7 then enters the URL of the security management server 1 and the one-time-code on his device 3', step 24, so that the device 3', in particular the application of the device 3', can connect to the security management server 1, step 26. In another step 28, the application generates a key pair on the device 3' including a user device certificate and a user device key for signing, after step 24. The user device certificate includes in particular a device identification number of the device 3'.

When the device 3' has connected to the security management server 1, after step 26, the security management server 1 sends a message including his server certificate and the fingerprint to the device 3', step 30. The user 7 then verifies the fingerprint of the server certificate on the device 3', step 32, and when the fingerprint is correct, the device 3' then sends his user device certificate to the security management server 1, step 34.

The security management server 1 then revokes the one-time-code, signs the user device certificate with his administrator key and associates the signed user device certificate, the user and the device 3' with the secured home network 4, step 36. In a further step 38, the security management server 1 sends the user device certificate signed by the administrator key to the device 3'. The device 3' then sends this signed user device certificate to any device 3 included in the secured home network 4 for an operation with the other devices 3 within the secured home network 4, step 40. The communication between each of the devices is therefore secured by using for each of the devices 3, 3' a respective user device certificate signed by the administrator key for identification. Other devices not having a user device certificate signed by the administrator key cannot communicate with the devices 3, 3' of the secured home network 4.

Figure 3:
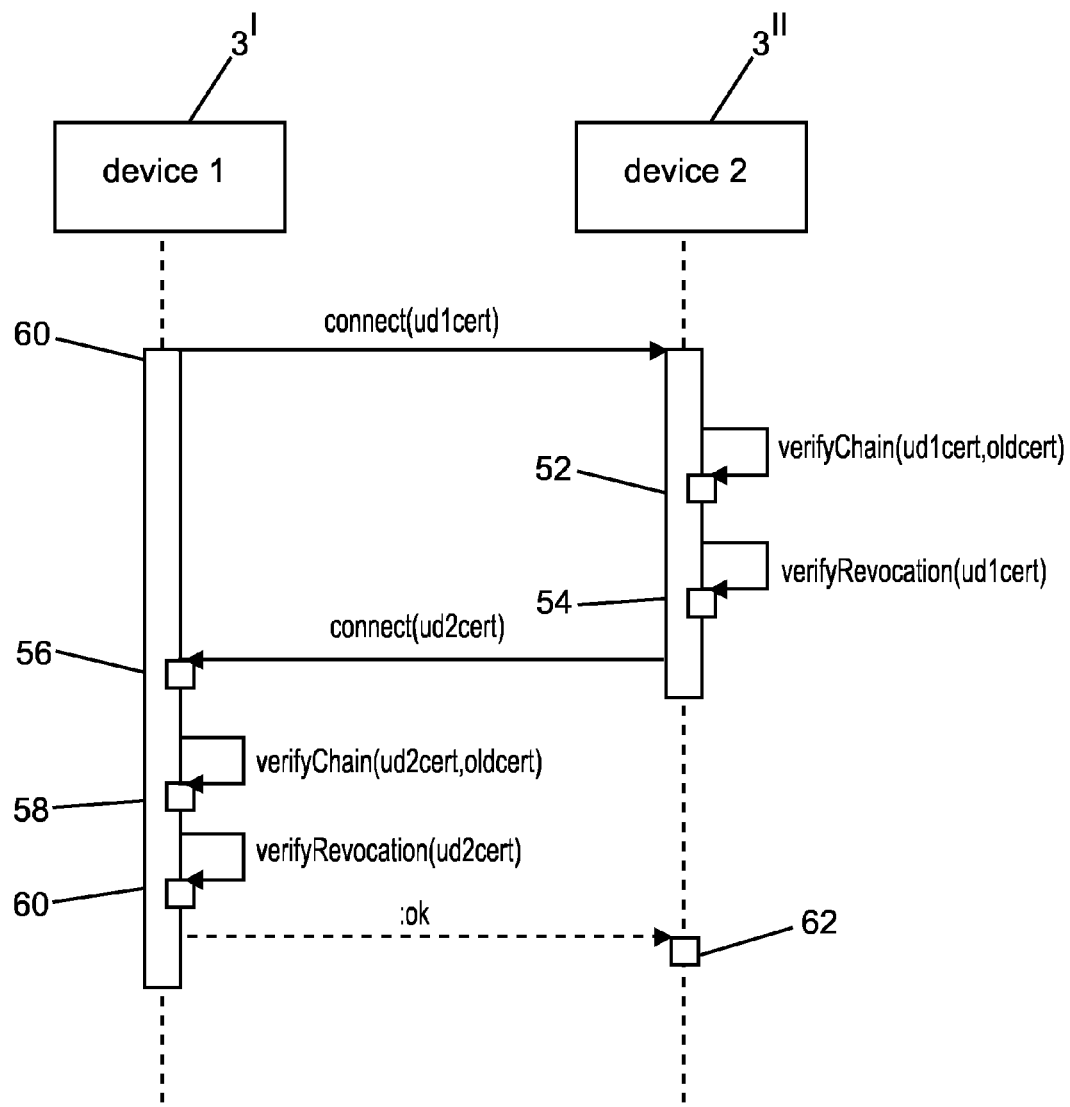

A method for providing a secure communication between the device 3' with a device 3 of the secured home network 4 is illustrated in FIG. 3. A user of the device 3' connects to the device 3 of a second user by sending a message including its user device certificate signed by the administrator key, step 50. In step 52, the device 3 verifies the user device certificate of the device 3' by using the server certificate of the security management server 1. The device 3 checks also whether the user device certificate of the device 3' is not revoked, step 54. In case the device 3' is verified, the device 3 connects to the device 3' by sending a message including its user device certificate signed with the administrator key, step 56. The device 3' then verifies the user device certification of the device 3 by using the server certificate, step 58, and checks also whether the user device certificate of the device 3 is not revoked, step 60. When the user device certificate of the device 3 is valid, the devices 3, 3 are ready for a communication and for using applications between each other, step 62.

The invention has the advantage that only trusted users are allowed within the secured home network 4, and only registered devices 3 of trusted users can be used for operating with devices of the secured home network 4. Communication therefore only happens between registered devices within the secured home network 4. In addition, the communication between the devices 3 of the secured home network 4 can be encrypted. This protects valuable information of the registered users against any malicious use. Further, the administrator of the secured home network 4 can revoke a registered user by revoking all his devices. Also a lost or stolen device can be revoked. A user-based access control is also possible. In addition, there is no need for a permanent connection to the security management server 1 for the devices 3 within the registered home network 4. The connection to the security management server 1 is necessary for example only for adding a new user or a new user's device to the secured home network 4, or for revoking any permission.

Also other embodiments of the invention may be utilized by one skilled in the art without departing from the scope of the present invention. The invention resides therefore in the claims herein after appended.

The invention claimed is:

1. A network system comprising:
a security management server and a secured home network controlled by an administrator, wherein a first device is added to the secured home network by the security management server which:
transmits, to the administrator, a one-time code associated with the first device, said one-time code being created by the security management server upon reception of a request from the administrator,
verifies the one-time code embedded in a request for a server certificate received from the first device, the one-time code as well as a Uniform Resource Locator being provided to the first device by the administrator,
receives a user device certificate generated in the first device in response to sending a server certificate to the first device and the first device verifying the server certificate with a server fingerprint,
revoke the one time code,
sends the user device certificate being signed with an administrator key associated to the administrator of the secured home network to the first device, the user device certificate being signed by the security management server and used by the first device for communication with a second device of the network system.

2. The network system according to claim 1, wherein the security management server uses the one-time code to identify the first device, and the server certificate is verified on the first device via the fingerprint.

3. The network system according to claim 1, wherein device to device communication is provided only after mutual authentication between devices, for which each of the devices need a certificate, and each of the devices are registered on the security management server.

4. The network system according to claim 1, wherein the security management server is located remotely from the home network and the network system is adapted for connection with the security management server via a broadband connection.

5. A method for including a device in a network system comprising a security management server and secure home network controlled by an administrator, the method being executed by the security server and comprising:

transmitting, to the administrator, a one-time-code associated to said device as well as a Uniform Resource Locator of the security management server, said one-time code being created by the security management server upon receipt of a request from the administrator, detecting a connection of said device using the one-time code and the Uniform Resource Locator, said one-time code and said Uniform Resource Locator being provided to said device by the administrator, receiving a user device certificate in response t sending a server certificate to said device and the first device verifying the server certificate with a server fingerprint, revoking the one time code, sending to said device a user device certificate signed with an administrator key associated to said administrator, the user device certificate being signed by the security management server and used by said device for connecting to second devices of the network system.

6. The method according to claim 5, wherein the device generates a key pair comprising the user device certificate and a user device key, after the one-time-code and the Uniform Resource Locator has been entered.

7. The method according to claim 5, wherein the security management server associates the user device certificate signed with the administrator key- and the device with the home network.

8. The method according to claim 5, wherein a fingerprint is provided to the device together with the one-time-code, the message including the server certificate includes in addition a fingerprint, and the fingerprint included in the message has to be verified on the device using the fingerprint provided with the one-time-code before the device sends the user device certificate to the security management server.

9. A security management server for adding a first device to a secured home network controlled by an administrator, wherein the security management server comprises a processor configured to:

transmit, to the administrator, a one-time code associated with the first device, said one-time code being created by the security management server upon receipt of a request from the administrator, verify the one-time code embedded in a request for a server certificate received from the first device, the one-time code as well as a Uniform Resource locator being provided to the first device by the administrator, receive a user device certificate generated in the first device in response to sending a server certificate to the first device and the first device verifying the server certificate with a server fingerprint, revoke the one time code, send the user device certificate being signed with an administrator key associated to the administrator of the secured home network to the first device, the user device certificate being signed by the security management server and used by the first device for communication with a second device of the network system.

10. A device activated in a network system comprising a security management server and a secured home network controlled by an administrator, the device comprising a processor configured to:

connect to the security management server using a one-time-code created by the security management server upon request from the administrator and a Uniform Resource locator of the security management server, said one-time code and Uniform Resource Locator being provided to the device by the administrator, receive a message from the security management server including a server certificate of the security management server, send a user device certificate to the security management server upon verification of the server certificate, receive, from the security management server, the user device certificate signed with an administrator key associated to the administrator of the secured home network after the one time code is revoked, and connect to second devices of the network system using the user device certificate signed with the administrator key for identification.

* * * * *